United States Patent
Beck

[15] 3,680,878
[45] Aug. 1, 1972

[54] WHEELED VEHICLE INCLUDING HYDRAULIC LEVELING SYSTEM

[72] Inventor: Eugene F. Beck, 29800 Seaview Road, Cazadero, Calif. 95421

[22] Filed: May 15, 1970

[21] Appl. No.: 37,702

[52] U.S. Cl.............................280/6 H, 280/124 F
[51] Int. Cl..............................................B60g 17/00
[58] Field of Search.........280/6, 6 R, 6.1, 6 H, 124 F

[56] References Cited

UNITED STATES PATENTS

| 3,191,954 | 6/1965 | Schuetz | 280/6 H |
| 3,285,623 | 11/1966 | Van Winsen | 280/6 R |

FOREIGN PATENTS OR APPLICATIONS

| 1,129,846 | 5/1962 | Germany | 280/6 R |

Primary Examiner—Philip Goodman
Attorney—Mellin, Moore & Weissenberger

[57] ABSTRACT

A hydraulic system comprising a pair of hydraulic motors or rams mechanically and hydraulically connected in opposition to each other and control means for simultaneously operating the rams either in tandem or in opposite sense to each other is disclosed. Various embodiments of the control means are described and a wheeled vehicle embodying the hydraulic system is disclosed.

5 Claims, 8 Drawing Figures

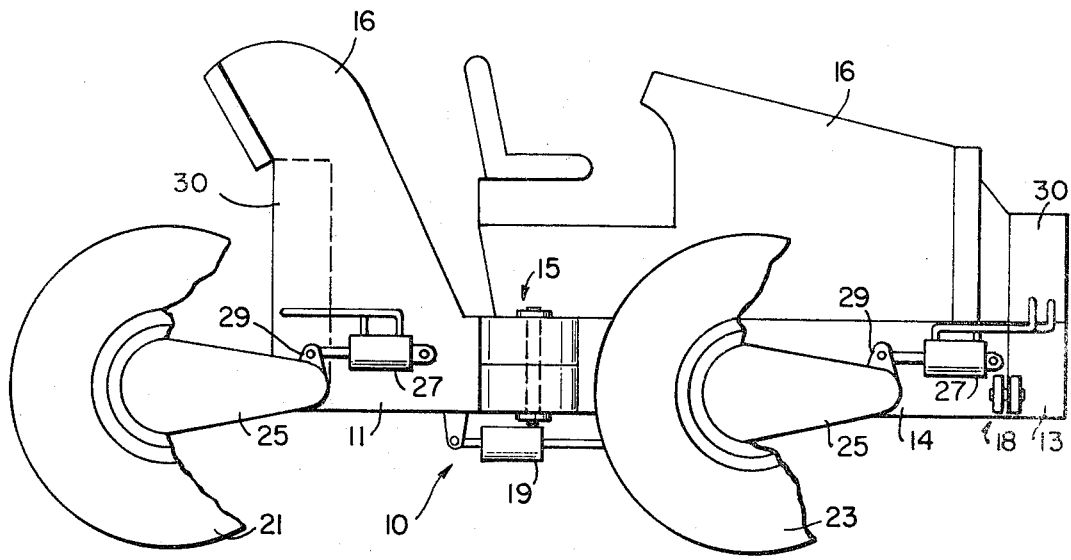
FIG_1
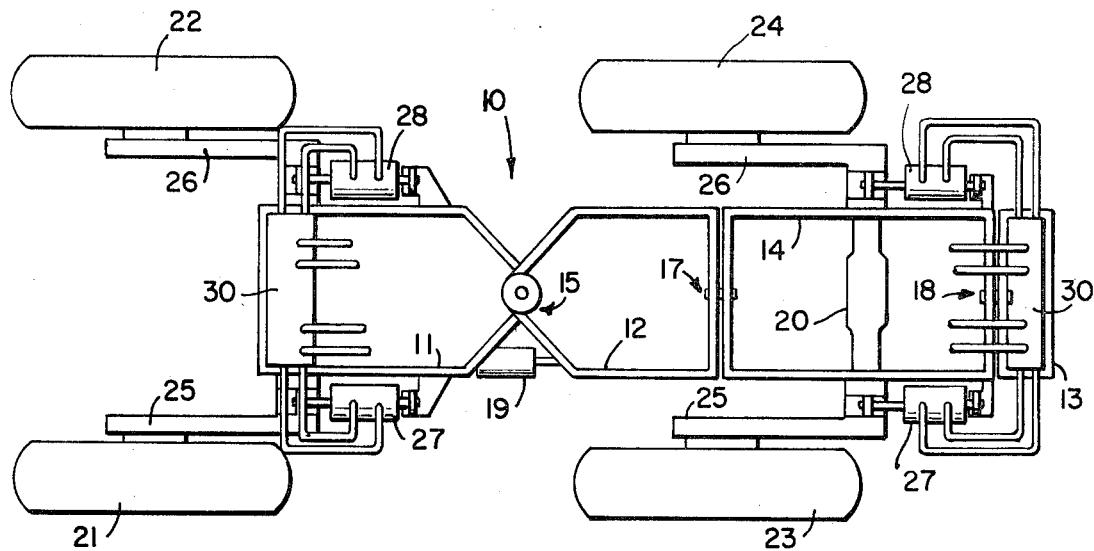
FIG_2
INVENTOR.
EUGENE F. BECK
BY
ATTORNEYS

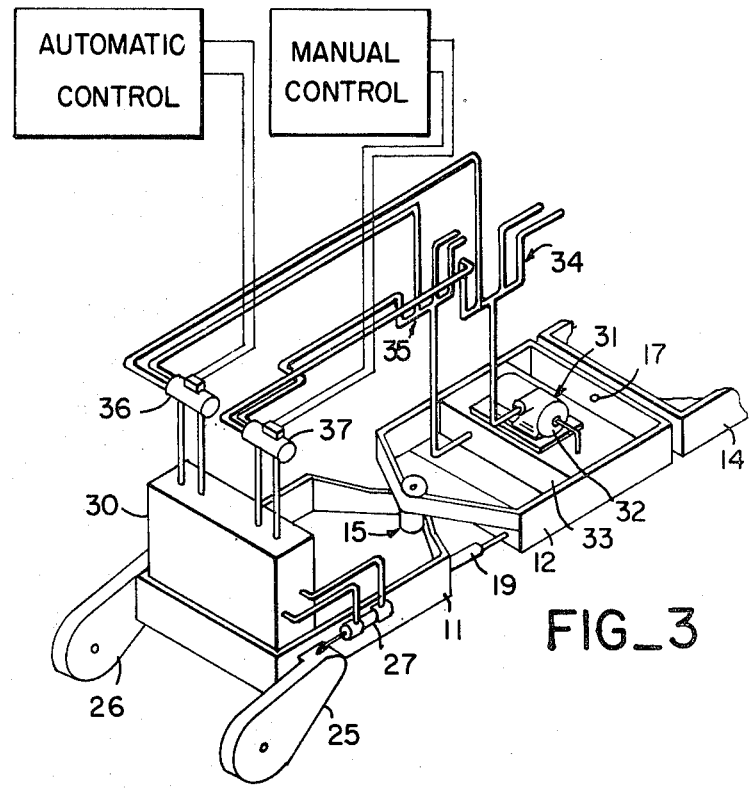
FIG_3
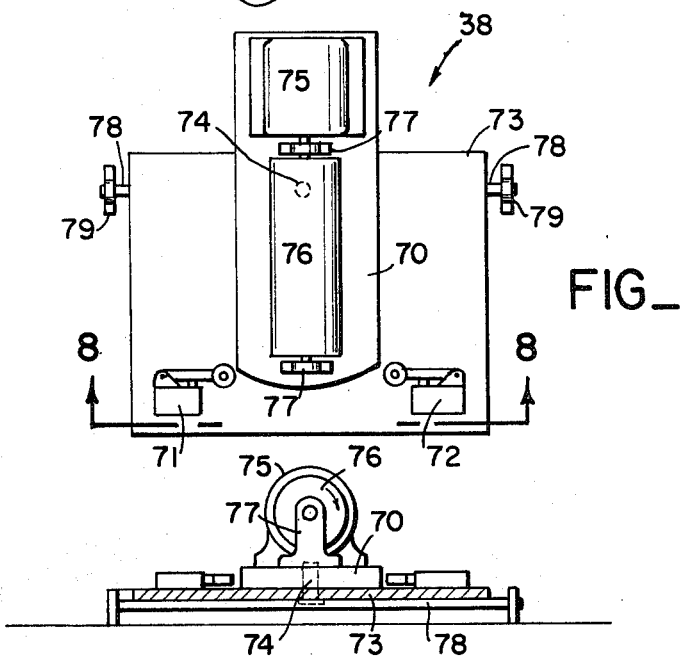
FIG_7
FIG_8

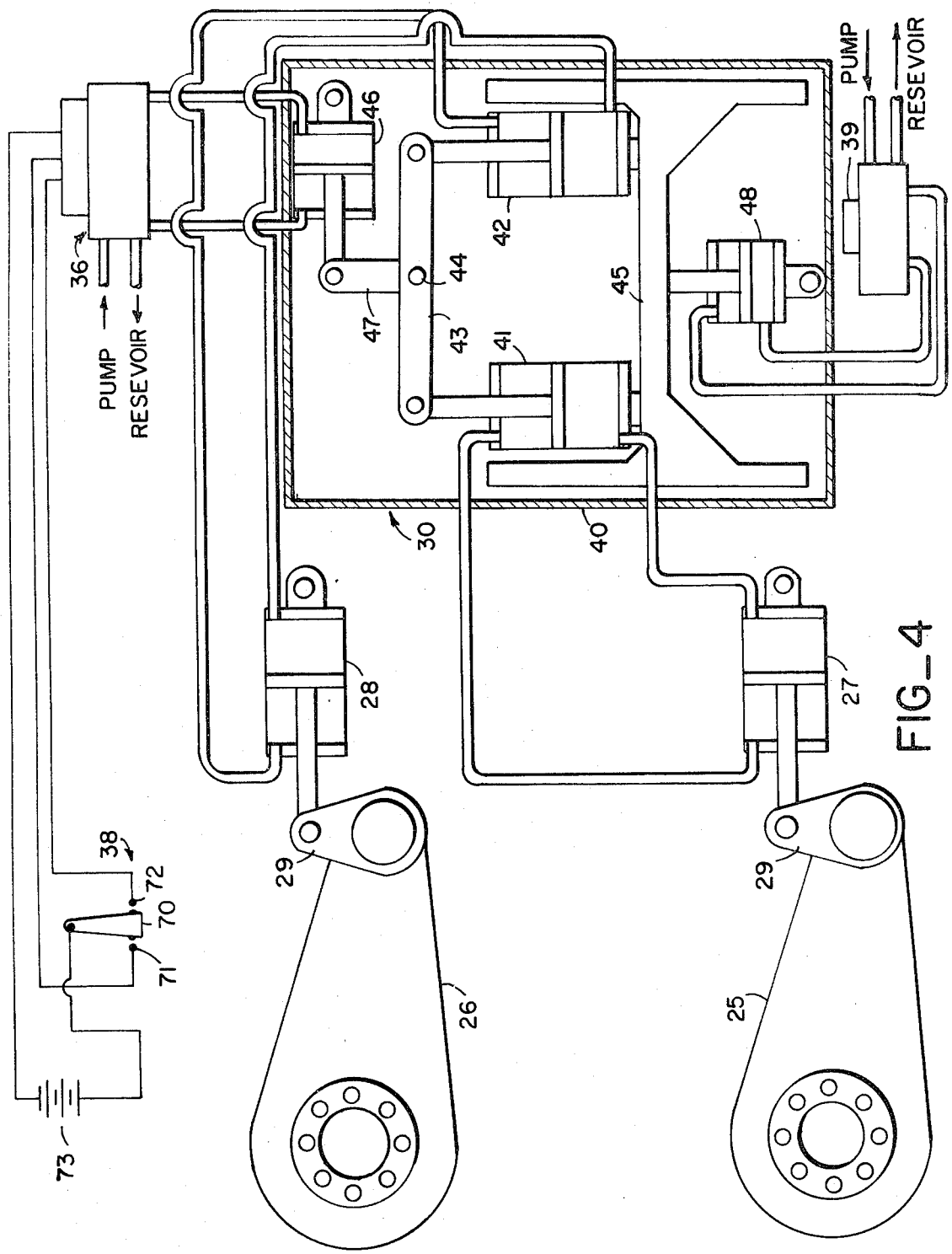

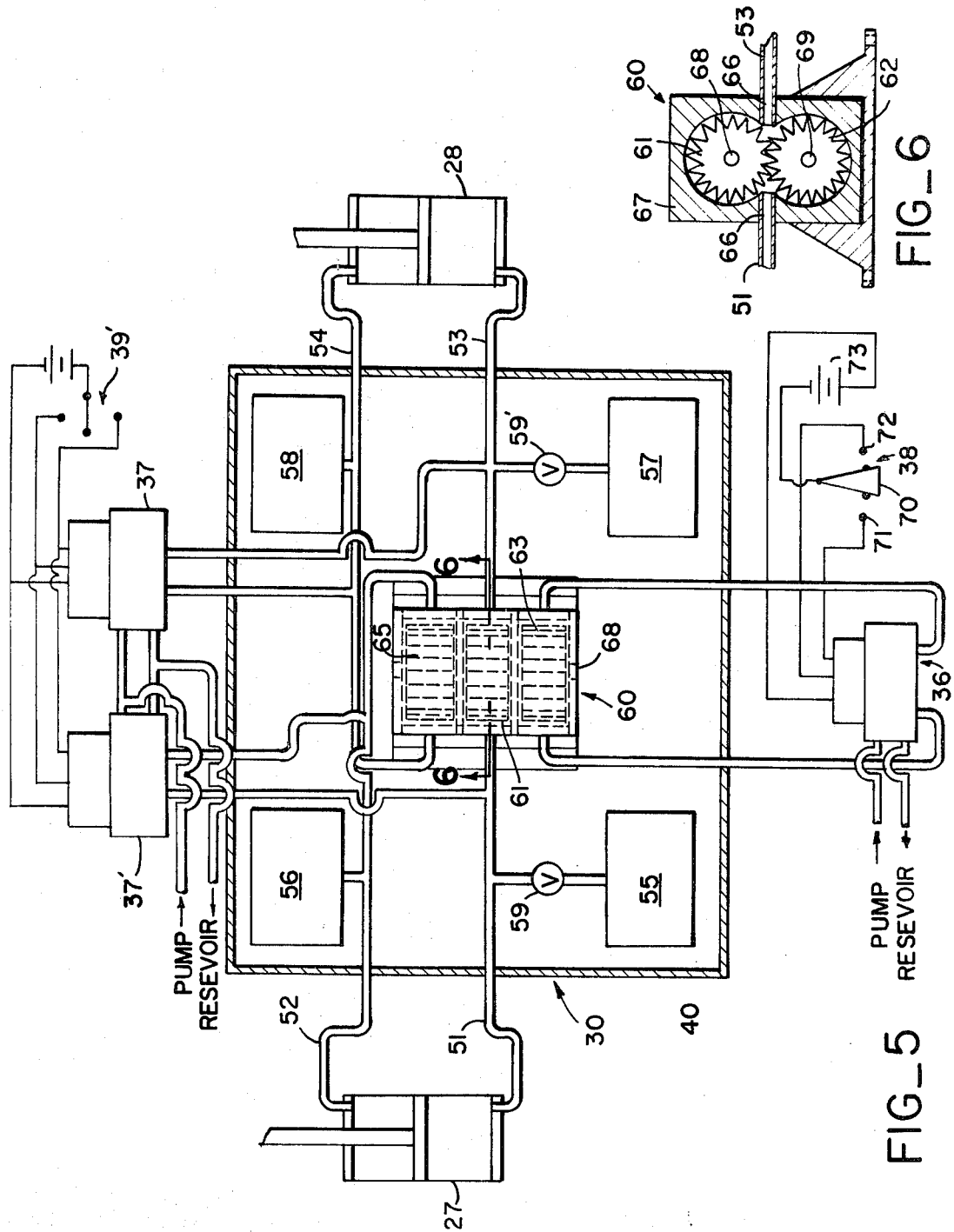

WHEELED VEHICLE INCLUDING HYDRAULIC LEVELING SYSTEM

BACKGROUND OF THE INVENTION

This invention relates to wheeled vehicles including hydraulic leveling systems and more particularly to such vehicles including hydraulic systems in which a pair of hydraulic motors or rams operate in opposite sense to each other to achieve the desired leveling.

There are many applications in which it is desired to control the orientation or positioning of some element, member or device through the action of hydraulic motors. For example, a hydraulic motor or ram has been used between each wheel and the frame of wheeled vehicles in order to enable the position of the wheels to be varied vertically with respect to the frame and thereby maintain the frame level on uneven or sloping terrain. In order to maintain the frame at a given average height above the terrain it is, of course, necessary to operate certain of the hydraulic rams in opposite sense to the others. In other words, pressure is applied to certain of the hydraulic rams and, simultaneously, pressure on other hydraulic rams is released. Unfortunately, in such a system the forces involved are not balanced with the result that "hunting" and "exhaustion" will inherently occur unless corrected by skillful manual operation. "Hunting" means that the system will overreact when a particular change in the orientation is sought, requiring a counter-change to correct the first overreaction and resulting in a further opposite overreaction, so that an oscillation will occur about the desired new orientation until the system eventually stabilizes. "Exhaustion" means that upon each change in orientation, one of the rams will react to a greater extent than the other ram so that after repeated changes in orientation one or both of the rams will eventually reach the limit of its ability to react again. These effects are particularly pronounced in systems designed to provide automatic control over the rams to maintain a particular orientation of an element, member or device, under conditions involving changing forces thereon.

Thus, considering the example of a wheeled vehicle given above, assume that it is desired to maintain the transverse dimension of the vehicle level. Under such conditions, the hydraulic rams of each pair of wheels on opposite sides of the vehicle frame would be operated in opposite sense to each other so that one extends when the other contracts in order to maintain the transverse dimension of the vehicle level on sloping or uneven terrain. However, the weight of the vehicle will tend to be unevenly distributed between the pair of wheels, particularly during the time when the hydraulic rams are acting to correct for a changed condition in the terrain. The net result of the uneven distribution of weight will be that one of the rams will over-react with respect to the other ram resulting in both "hunting" and "exhaustion" as described above.

It is an object of this invention to provide an improved hydraulic system comprising a pair of hydraulic motors or rams mechanically and hydraulically connected in opposition to each other whereby "hunting" and "exhaustion" effects are reduced.

It is a further object of this invention to provide an automatically controlled hydraulic system comprising a pair of hydraulic motors or rams mechanically and hydraulically connected in opposition to each other whereby "hunting" and "exhaustion" effects are reduced.

It is another object of this invention to provide an improved hydraulic system for automatically maintaining a wheeled vehicle in substantially a selected orientation with respect to the horizontal when operated on sloping or uneven terrain.

It is yet another object of this invention to provide an improved wheeled vehicle for use in providing motive power on uneven or sloping terrain.

It is a still further object of this invention to provide improved control means for operating in opposite sense to each other a pair of double-acting hydraulic rams mechanically and hydraulically connected in opposition to each other.

SUMMARY OF THE INVENTION

Briefly, a wheeled vehicle in accordance with this invention includes a hydraulic system comprising a pair of double-acting hydraulic rams, mechanical means interconnecting such rams in opposition to each other, hydraulic means interconnecting such rams to enable either ram to drive the other hydraulically in the opposite sense, and hydraulic control means for controlling such hydraulic means interconnecting such rams whereby such rams may be hydraulically operated simultaneously either in tandem or each in the opposite sense to the other from a common source of pressurized fluid.

DESCRIPTION OF THE DRAWINGS

This invention will be more fully understood from the following detailed description of preferred embodiments thereof when read in conjunction with the drawing wherein:

FIG. 1 is a side view in elevation of a wheeled vehicle including a hydraulic system in accordance with the teaching of this invention.

FIG. 2 is a simplified top plan view of the wheeled vehicle shown in FIG. 1 in which portions of the superstructure thereof have been omitted for ease of understanding this invention.

FIG. 3 is a fragmentary perspective view of a portion of the wheeled vehicle 25 shown in FIG. 2 with portions of the hydraulic system of this invention indicated schematically.

FIG. 4 is a schematic drawing of a hydraulic system in accordance with one embodiment of this invention.

FIG. 5 is a schematic view of a hydraulic system in accordance with another embodiment of this invention.

FIG. 6 is a fragmentary cross-sectional view taken along line 6—6 of FIG. 5.

FIG. 7 is a view in elevation of a pendulum mechanism which may be used in accordance with the teaching of this invention.

FIG. 8 is a view taken along lines 8—8 of FIG. 7.

DESCRIPTION OF PREFERRED EMBODIMENTS

Referring to FIGS. 1 and 2, a wheeled vehicle on which a hydraulic system in accordance with the teaching of this invention may be used to advantage is shown. Such wheeled vehicle comprises an articulated frame indicated generally at 10. Such articulated frame comprises a first portion consisting of three sections 11, 12 and 13 and a second portion consisting of section 14. Sections 11 and 12 are directly interconnected mechanically by an articulation joint 15 adapted for horizontal rotation. The third section 13 of the first portion of the frame is mechanically interconnected with sections 11 and 12 by means of the superstructure 16 of the wheeled vehicle and the other portion 14 of the frame is interposed between such third section 13 and the section 12 of the first portion of the frame and mechanically interconnected therewith by means of oscillation joints 17 and 18 adapted for vertical rotation. A first pair of wheels 21 and 22 are mounted on section 11 of the first portion of the frame and a second pair of wheels 23 and 24 are mounted on section 14 comprising the other portion of such frame 10. Thus it will be seen that the vehicle may be steered by means of a hydraulic ram 19 mechanically interposed between sections 11 and 12 of the first portion of the frame 10 and adapted to cause such sections 11 and 12 to pivot horizontally with respect to each other about the vertical axis of the articulation joint 15. Similarly it will be seen that the second portion of the frame 10 comprising section 14 may pivot vertically with respect to the first portion of the frame 10 about the horizontal axis of the oscillation joints 17 and 18 thereby preventing the frame 10 from being subjected to undesirable longitudinal twisting forces which would otherwise occur between the pairs of wheels when the vehicle is operated on uneven or sloping terrain.

As shown in FIGS. 1 and 2, the wheels 21 and 22 of the first pair of wheels and the wheels 23 and 24 of the second pair of wheels are mounted on the frame 10 by means of mutually independent rocker arms 25 and 26. Such rocker arms are pivotally mounted on the frame at one end thereof and have a wheel journalled thereon at the other end thereof. A chain drive mechanism may be disposed in such arms to transmit power available at the end thereof which is pivoted to the frame 10 (e.g., from a differential as indicated at 20) to the wheels which are journalled at the opposite end thereof. As is best shown in FIG. 1, each of such arms 25 and 26 may be caused to pivot with respect to the frame 10 by means of hydraulic rams 27 or 28, respectively, which are connected between the frame and a rigid lever arm indicated at 29 which is affixed to each of such arms 25 and 26. It will be understood that if the rams 27 shown in FIG. 1 are extended, the arms 25 will be caused to pivot downwardly, driving the wheel 21 or 23 downwardly with respect to the frame and thereby tending to elevate one side of the frame with respect to the terrain upon which the wheels rest. Similarly, if the rams 27 are retracted, the arms 25 will be pivoted upwardly with respect to the frame 10, thereby tending to lower one side of the frame with respect to the terrain. The rams 28 acting on the rocker arms 26 produce the same effect on the opposite side of the frame 10.

In accordance with this invention, the rams 27 and 28 are double-acting rams and may be hydraulically driven either in opposition to each other or in tandem with each other from a common source of pressurized fluid through a hydraulic control means indicated generally at 30. Thus in accordance with the teaching of this invention, the frame 10 may be raised or lowered with respect to the terrain by operating the cylinders 27 and 28 in tandem and a particular orientation of the frame with respect to the terrain at a given average height therefrom may be obtained by operating the cylinders 27 and 28 in opposition to each other. Such operation will be more fully understood by reference to FIG. 3.

Referring to FIG. 3, a fragmentary perspective view of the frame of a vehicle as described in connection with FIGS. 1 and 2 is shown together with elements of a hydraulic system in accordance with this invention. The reference numerals of FIGS. 1 and 2 have been used in FIG. 3 to indicate common parts or elements. As shown in FIG. 3 a source of pressurized fluid indicated generally at 31 and comprising a hydraulic pump 32 and a reservoir for hydraulic fluid 33 may be mounted on any section of the frame, for example section 12. The pump 32 may be driven by the prime power source (not shown) of the vehicle by means well known in the art, in order to provide hydraulic fluid to an appropriate distribution system 34 at a pressure at least sufficient to support the weight of the vehicle by means of hydraulic rams 27 and 28. For example, a wheeled vehicle in which the hydraulic system of this invention may be used to advantage may have a total loaded weight in operation approaching 12 tons. If hydraulic rams 27 and 28 have a cylinder diameter of eight inches, for example, and if the ratio of the length of the rocker arms 25 and 26 to the rigid lever arms 29 is four to one, for example, a pressure of some 2,000 lbs. per sq. inch would be required to support the entire weight of the vehicle on one of the rams. However, in operation, the weight of the vehicle will always tend to be distributed among the four wheels thereof so that a substantially lower pressure, for example 1,000 –1,500 lbs. per sq. inch will be sufficient for normal operating condi-tions. A connection to the reservoir 33 for various parts of the hydraulic system is provided through a distribution means 35.

As shown in FIG. 3, a dual connection is made between the hydraulic control means 30 in accordance with this invention and the pump 32 and reservoir 33 through a pair of four-way valves 36 and 37. One of such valves 36 is utilized to cause the hydraulic control system 30 to operate the hydraulic rams 27 and 28 in an opposite sense to each other, whereas the other four-way valve 37 is used to cause the hydraulic control system 30 to operate the rams 27 and 28 in tandem with each other as will be more fully described hereinafter. Appropriate four-way valves for use in the hydraulic system in accordance with this invention are known in the art. The function of such valves is to enable pressurized fluid to be supplied to a selected one of a pair of hydraulic lines while the other of such pair of hydraulic lines is connected to the reservoir. Such valves may be mechanically, hydraulically, pneumatically or electrically actuated by any appropriate control means 38, 39. As shown in FIG. 3, the four-way valve 36 which is utilized in operating the rams 27 and 28 in opposite sense to each other may be automatically controlled by an appropriate device 38 and the four-way valve 37 which is utilized to operate rams 27 and 28 in tandem may be manually controlled by an appro-priate device 39. However, it will be understood that both of such four-way valves may be automatically controlled, manually controlled or provided with a combination automatic/manual control.

Referring to FIG. 4, the details of a hydraulic control means 30 in accordance with one embodiment of this invention are shown schematically. In FIG. 4 the rocker arms 25 and 26 together with the associated double-acting hydraulic rams 27 and 28 and the hydraulic connection of such rams to the control means 30 are indicated schematically. In addition the four-way valves 36 and 27 together with their hydraulic connections to the control means 30 and to the pump and reservoir are indicated schematically. Finally, and electrical automatic control for the four-way valve 36 is indicated schematically. As shown in FIG. 4, a simple manual control 39 is mounted directly on the four-way valve 37.

The hydraulic control means 30 according to this embodiment of the invention comprises a heavy-duty control frame 40 in the form of a hollow box made of heavy gauge steel. A pair of double-acting hydraulic rams 41 and 42 are mounted within the frame 40 in the manner to be described hereinafter. A pair of hydraulic lines connect the ram 41 to the ram 27 and a second pair of hydraulic lines connect the ram 42 to the ram 28 as shown. The ram 41 and the ram 27 as well as the pair of hydraulic lines extending therebetween are completely filled with hydraulic fluid. Thus, any movement in the piston of either ram 41 or 27 will result in an immediate and corresponding movement in the piston of the other. Similarly, rams 42 and 28, as well as hydraulic lines extending therebetween are completely filled with hydraulic fluid so that a movement of a piston of one of the rams 42, 28 will result in an immediate and corresponding movement of the piston of the other ram. According to the preferred embodiment of this invention, the displacement of all four rams 27, 28, 41 and 42 is the same. Furthermore, the portion of the cylinder on the side of the piston containing the drive rod of the ram 27 is connected to the portion of the cylinder on the side of the piston containing the drive rod of the ram 41 by means of the first one of the pair of hydraulic lines and the other portions of the cylinders of rams 27 and 41 are connected by the second one of the pair of hydraulic lines. Hydraulic rams 28 and 42 are connected in a similar fashion by the pair of hydraulic lines associated therewith so that all four hydraulic rams 27, 28, 41 and 42 are balanced in terms of their relative movements in response to a given change in pressure of the hydraulic fluid on opposite sides of the pistons thereof.

As described hereinabove, the cylinders of rams 27 and 28 are mounted on the vehicle frame 10 and hydraulic rams 27 and 28 are connected to rocker arms 25 and 26 respectively by means of rigid lever arms 29 so that an extension of the drive rods of hydraulic rams 27 and 28 from the cylinders thereof will cause such rocker arms to rotate downwardly. The retraction of the drive rods of hydraulic rams 27 and 28 into their respective cylinders will cause rocker arms 25 and 26 to rotate upwardly as shown in FIG. 4 and described hereinabove. The drive rods of hydraulic rams 41 and 42 are pivotally attached to opposite ends of a control arm 43. The control arm 43 is mounted on the control frame 40 by means of a pivot 44 equally spaced from the ends thereof. The cylinders of the rams 41 and 42 are pivotally mounted on a guide member 45 which will be more fully described hereinafter but which may be considered to be rigidly mounted on the control frame 40 for the moment. Thus it will be seen that if the control arm 43 is pivoted about the pivot point 44 it will tend to push the drive rod of one of the hydraulic rams 41, 42 into its associated cylinder and pull the drive rod of the other ram out of its associated cylinder. Due to the hydraulic interconnection of hydraulic ram 41 with hydraulic ram 27 and the hydraulic interconnection of the ram 42 with the ram 28, corresponding movements in the drive rods of rams 27 and 28 will result. Thus the mechanical result of the mechanism thusfar described is to cause the two rocker arms 25 and 26 to operate in opposition to each other. That is, when rocker arm 25 rotates downwardly, rocker arm 26 must rotate upwardly and vice versa.

However, a more important result of the mechanism thusfar described is to insure that the force tending to cause one of the rocker arms to rotate in a particular direction will be exactly equal to the force tending to cause the other rocker arm to rotate in the opposite direction. Thus, if a wheel journalled in the end of rocker arm 25 is resting on the ground, whereas the wheel journalled in the end of rocker arm 26 is not touching the ground, there will be a substantial force tending to rotate the rocker arm 25 in an upward direction due to the weight of the vehicle, and a much smaller force tending to rotate the rocker arm 26 in a downward direction due solely to the weight of the wheel and the rocker arm itself. However, the mechanism thusfar described will couple the force tending to drive the rocker arm 25 upwardly to the rocker arm 26 in such a way as to tend to drive it downwardly. For this reason, the forces throughout the system are balanced, thereby enable the "hunting" and "exhaustion" effects in the automatic control of the system to be reduced toward a minimum.

As shown in FIG. 4, the mechanism thusfar described is controlled by means of a control ram 46 having its cylinder pivotally mounted on the control frame 40 and its drive rod connected to the control arm 43 by means of a control lever 47. One end of the control lever 47 is rigidly attached to the control arm 43 at the point where the control arm 43 is pivotally mounted to the frame 40 and transversely to the axis of such pivotal mounting 44. The drive rod of the control ram 46 is pivotally connected to the opposite end of the control lever 47. Thus the extension and retraction of the drive rod of the control ram 46 will cause the control arm 43 to pivot about its pivotal mounting 44, pushing the drive rod of one of the rams 41, 42 into its cylinder and pulling the drive rod of the other ram out of its cylinder. Such relative motion will be hydraulically coupled to the rocker arms 25 and 26 through the rams 27 and 28 as described hereinabove.

The control ram 46 may be conveniently controlled by connecting it to the hydraulic pump and reservoir through the four-way valve 36, as shown. Thus it will be seen that the operation of the four-way valve 36 will cause the rocker arms 25 and 26 to be driven in opposite sense to each other by means of the rams 27 and 28 through the control mechanism described above. As shown in FIG. 4, the four-way valve 36 may be electrically actuated and an automatic control circuit comprising a pendelum 70 pivotally mounted on the frame 10 of the vehicle and adapted to make electrical contact with either contact member 71 or contact member 72 if the vehicle should tip in one direction or the other. An appropriate source of electrical energy such as battery 73 provides the necessary energy to actuate the four-way valve 36 thereby providing an automatic control circuit which may be adapted to maintain the vehicle in a level position on horizontal or inclined terrain.

The hydraulic control means 30 in accordance with this invention also enables the entire vehicle to be raised or lowered with respect to the terrain while maintaining the desired level orientation. According to the embodiment of this invention, shown in FIG. 4, this is accomplished through the use of a further double-acting hydraulic ram 48. The cylinder of such further ram 48 is mounted on the control frame 40 and the drive rod of such further ram 48 is rigidly attached to the guide member 45. Thus the actuation of the ram 48 will cause the guide member 45 to slide back and forth within the control frame 40. Since the cylinders of both rams 41 and 42 are mounted on the guide member 45, the movement of the guide member 45 within the frame 40 will result in relative movement in the same sense between the pistons and cylinders of the rams 41 and 42, it being understood that control ram 46 will maintain a given relative position of the pistons of the rams 41 and 42 with respect to each other. Thus, as shown in FIG. 4, if the drive rod of the ram 48 is retracted, it will cause the drive rods of the rams 41 and 42 to be further extended with respect to their respective cylinders which will in turn result in the retraction of the drive rods of rams 27 and 28 and the simultaneous rotation of rocker arms 25 and 26 in an upward direction. The extension of the drive rod of the ram 48 from its cylinder will, of course, produce an opposite result. The ram 48 is connected to the pump and reservoir of the hydraulic system through the four-way valve 37. According to the embodiment of this invention, shown in FIG. 4, the four-way valve 37 is actuated by a manual control 39 which may be a simple manually-operated switch to enable the control of the ram 48.

It will be seen that both four-way valves 36 and 37 may be operated simultaneously from a common hydraulic pump without upsetting the balance of forces which will exist in the system as described hereinabove. It will be understood that the control frame 40 according to this embodiment of the invention need not have the box configuration described hereinabove; instead, any appropriate frame configuration providing for the mounting of the control ram 46, the control arm 43, the further ram 48 with appropriate means for guiding the guide member 45 may be used. It will be understood that such frame must be sufficiently strong to withstand a force equal to the full weight of the vehicle between the pivotal mounting 44 and the mounting of the further ram 48 to such frame. Similarly, the lever arm 47 and the frame members extending between the pivotal mounting 44 and the mounting of the control ram 46 to such members must be sufficiently strong to withstand instantaneous forces that may approach the full weight of the vehicle. Thus it will be seen that the embodiment of this invention shown in FIG. 4 will be subject to substantial mechanical wear in operation and that wear resistance of the materials used as well as the strength of such materials must be carefully taken into account in designing such embodiment.

Referring to FIGS. 5 and 6, an embodiment of this invention is shown in which problems associated with mechanical wear and mechanical strength of materials are reduced toward a minimum by the use of hydraulic mechanisms rather than mechanical mechanisms wherever possible. The hydraulic rams 27 and 28 which are connected between the frame of the vehicle and the rocker arms 25 and 26 respectively as described hereinabove are shown schematically. According to this embodiment of the invention, the rams 27 and 28 are interconnected through a hydraulic control means 30 which comprises a three-stage hydraulic pump 60 of the rotary type. As shown in FIG. 6, each stage of such pump 60 comprises a pair of intermeshing gears 61 and 62, Each gear of each pair of gears is housed within a closely fitting cylindrical cavity within the body 67 of the pump 50. The gears 61 and 62 are mounted for rotation on shafts 68 and 69. According to this embodiment of the invention, the shafts 68 and 69 are common to all three stages of the pump 50. Thus one gear 61, 63, 65 of each pair of gears is mounted on shaft 68 and the other gear of each pair is mounted on shaft 69. Channels for the introduction of hydraulic fluid into each stage of the pump are provided in the body 67 of the pump. As shown in FIG. 6, such channel 66 intersects the cavaties housing each pair of gears 61, 62 and is adapted to be coupled to hydraulic lines to provide for the and egress of hydraulic fluid.

Referring to FIG. 5, it will be seen that the double-acting hydraulic rams 27 and 28 are hydraulically interconnected through two stages of the three-stage hydraulic pump 60. Thus a pair of hydraulic lines 51, 52 extend from opposite ends of the cylinder of hydraulic ram 27 with the hydraulic line 51 going to one side of a first stage of the pump 60 and the hydraulic line 52 going to the opposite side of another stage of the pump 60. Since the hydraulic lines 51 and 52 go to opposite sides of their respective stages of the pump, it will be seen that the flow of hydraulic fluid induced in such lines by a movement in one direction of the piston of the ram 27 will tend to cause the gears of the pump 60 to rotate in a given direction and movement of the piston of the ram 27 in the other direction will tend to cause the gears of the pump 60 to rotate in the opposite direction. Similarly, the double-acting hydraulic ram 28 is connected to the same two stages of the hydraulic pump 60 by means of hydraulic lines 53, 54 with the hydraulic line 53 being connected to the pump 60 in opposition to the hydraulic line 51 and the hydraulic line 54 being connected to the pump in opposition to the hydraulic line 52. Thus it will be seen that a given rotation of the gears of the pump 60 will tend to drive the hydraulic rams 27 and 28 in opposition to each other. In other words, the rotation of the gears of the pump 60 in one direction will tend to extend the drive rod of the ram 27 and retract the drive rod of the ram 28 and rotation of the gears of the pump 60 in the opposite direction will have the opposite effect with respect to the drive rods of the rams 27 and 28. Although the stages of the pump 60 are all shown to be identical, it will be understood that the stage to which hydraulic lines 52 and 54 are connected must have a smaller displacement than the other two stages in order to compensate for the presence of the drive rods in the cylinders of rams 27 and 28 on the sides of the pistons thereof to which the lines 52 and 54 are connected. The other two stages of the pump 60 preferably have displacements equal to each other.

As shown in FIG. 5, the gears of the stages of the hydraulic pump 60 may be caused to rotate in a selected direction by means of hydraulic lines connecting the third stage of the pump 60 to the main pump and reservoir through the four-way valve 36. Thus, such third stage acts as a rotary motor driving the other two stages and the direction of rotation of the pump 60 may be controlled by actuation of the four-way valve 36. Such actuation of the four-way valve may be controlled by means of an electrical control circuit 38, for example, as described in connection with FIG. 4. Thus the pistons of the rams 27 and 28 may be caused to assume a desired relative position with respect to each other within their respective cylinders through the action of the third stage of the pump 60 and may be locked in such relative position by placing the four-way valve 36 in its neutral or closed position. As with the embodiment of this invention shown in FIG. 4, it will be seen that the forces acting on the pistons 27 and 28 will be balanced, since any excess force acting on one of the rams 27 will be communicated to the other ram 28 in an opposite sense, thereby reducing the "hunting" and "exhaustion" effects described hereinabove toward a minimum.

According to this embodiment of the invention, accumulators 55, 56, 57 and 58 are connected to the lines 51, 52, 53 and 54, respectively. Such accumulators are of the pressure type and function to cushion the shock which may occur during operation of the device and to provide excess hydraulic fluid to meet excessive demands which may result from such shock thereby preventing the formation of a vacuum in the system. As shown in FIG. 5, it is desirable to interpose a one-way reducing valve 59, 59' between the lines 51, 53 connected to the portion of the cylinder of each ram 27, 28 opposite the drive rod thereof and the accumulator 55, 57 associated with such line. Such one-way valve is oriented to resist the flow of hydraulic fluid out of the accumulator 55, 57 and thereby avoid shock reaction.

In order to operate the rams 27 and 28 in tandem rather than in opposition by the embodiment of the control means shown in FIG. 5, a pair of four-way valves 37, 37' may be used. Each one of such pair of four-way valves 37, 37' connects a different one of the rams 27 and 28 to the main pump and reservoir. As shown in FIG. 5, both four-way valves 37, 37' may be actuated simultaneously by common control means 39'. Such control means 39' may conveniently comprise a double-acting manually operated electrical switch through which a source of electric power such as a battery is connected in parallel to a pair of electrically actuated four-way valves 37, 37' as shown.

However, the second one 37' of the pair of four-way valves 37, 37' is not essential according to this embodiment of the invention since the automatic leveling system including the four-way valve 36, control 38 and pump 60 may be relied upon to maintain the desired relative positioning of the pistons of the rams 27, 28 with respect to each other. In other words, if a single four-way valve 37 is used it will actuate only ram 28 but such actuation will be sensed by the automatic control 38 and the ram 27 will be actuated through the pump 60, as required, to maintain the desired relative positioning of the rams 27, 28 with respect to each other.

It will be understood that the control device 30 according to this embodiment of the invention may be contained within an appropriate frame 40', however such frame 40' will not be subjected to any appreciable stresses during operation. It will be understood that the four-way valves and the electrical control systems could be included within the frame 40' which may conveniently take the form of a box housing the entire system with provision for connecting it to the rams 27, 28 and to the main pump and reservoir. Thus the hydraulic system according to this invention may take the form of a single physical unit which may be easily incorporated into existing hydraulic systems which utilize appropriate double-acting rams such as rams 27 and 28.

Referring to FIGS. 7 and 8, a pendulum mechanism particularly suited for use in an automatic control 38 as described hereinabove as shown. The pendulum system comprises a pendulum plate 70 which, together with contact elements 71 and 72, is mounted on a base plate 73. The pendulum plate 70 is mounted on the base plate 73 by means of a pivot 74 and the contact elements 71 and 72 are mounted on the base plate on opposite sides of the pendulum plate 70 and are positioned so that the pendulum plate will swing into contact with one of the elements when it pivots in one direction and into contact with the other element when it pivots in the opposite direction. An electric motor 75 is mounted on the opposite side of the pendulum plate 70 from the base plate 73 and a massive member 76 is mounted on the shaft of the motor 75 for rotation thereby. The massive member 76 may conveniently take the form of an elongated cylinder having its axis coincident with the axis of the shaft of the motor 75. The shaft of the motor 75 may be journalled in appropriate bearings 77 mounted on the pendulum plate 70 at opposite ends of the massive member 76. It will be understood that the rotation of the massive member 76 about its axis by the motor 75 at speeds of 10,000 revolutions per minute or more will result in gyroscopic action causing the pendulum plate to resist forces tending to cause it to pivot about its mounting 74. Thus if the base plate 73 is mounted on the frame of a vehicle transversely thereof, the pendulum plate 70 will tend to maintain a vertical position and the base plate 73 will pivot with respect to the pendulum plate 70, tending to bring the pendulum plate 70 into contact with one or the other of the contact elements 71 or 72. Such contact elements 71 and 72 may be simple electrical contacts as described in connection with FIG. 4; however it will be understood to those skilled in the art that such contact elements 71 and 72 may take any one of a number of forms. For example, they may be pressure-sensitive electrical switches so that the pendulum plates 70 need not be in the electrical circuit. Similarly, they may be pressure-sensitive pneumatic or hydraulic switches.

It will be understood that the gyroscopic action described above will cause the pendulum plate 70 to resist displacement in any direction. For this reason, it may be desirable to mount the base plate 73 on the frame of the vehicle so that it may swing freely with respect to one axis of the vehicle but remain fixed with respect to the axis of the vehicle perpendicular thereto. For example, it is necessary that the vehicle tip along its longitudinal axis when climbing or descending inclined terrain, and it would be desirable for the hydraulic system disclosed herein to be insensitive to such longitudinal tipping, while reacting to transverse tipping of the frame of the vehicle. Thus the base plate 73 may be mounted on the frame of the vehicle by means of a shaft 78 having its axis transverse to the axis of both the axis of the massive member 76 and the axis of the pivot 74. Preferably, the axis of the shaft 78 should intersect the axis of the pivot 74 and the shaft 78 may be conveniently journalled in appropriate bearings 79 on opposite sides of the plate 73. Thus the gyroscopic action of the massive member 76 will maintain both the pendulum plate 70 and the base plate 73 in a verticle position in spite of longitudinal tipping of the vehicle, whereas transverse tipping of the vehicle will result in relative movement between the pendulum plate 70 and the base plate 73, bringing the pendulum plate into contact with one or the other of the contact elements 71 and 72.

As shown in FIG. 8, it would be possible to mount both the base plate 73 and the pendulum plate 70 on a common pivot 74 which extends from the shaft 78. An appropriate manual control means could then be provided to maintain the base plate 73 in a selected position of rotation about the pivot 74 with respect to the shaft 78, thereby enabling both manual and automatic control of the hydraulic system. It will be understood that the manual control (not shown) would be used to set the base plates 73 in a selected position of rotation about the pivot 74 with respect to the shaft 78 or to change that position as desired manually. Since the pendulum plate 70 will tend to remain verticle due to gyroscopic action, such changes in the position of the base plate 73 will tend to bring the pendulum plate 70 into contact with one or the other of the contact elements 71, 72, thereby actuating the hydraulic control system. If a simultaneous change should occur with respect to the position of the transverse axis of the vehicle on which the device is mounted, further relative movement between the base plate 73 and the pendulum plate 70 will occur, assuming that the manual control means is adapted to maintain the base plate in a particular position with respect to the transverse axis of the vehicle.

The pendulum system described above is believed to be particularly suited for use on vehicles in a hydraulic system as described hereinabove, since it will be insensitive to certain motions of the vehicle and will resist rapid changes, such as may be produced by sudden shocks, due to inertial effects and gyroscopic action, thereby further reducing the possibility of "hunting" effects occurring in the automatic operation of the system.

It will be understood that a vehicle embodying a hydraulic system in accordance with the teaching of this invention will always tend to have its weight evenly distributed among the wheels thereof, thereby insuring that each wheel will contribute the full amount of traction in driving the vehicle of which it is capable. Furthermore, it will be seen that a vehicle equipped with the hydraulic system as described in accordance with the teaching of this invention, will tend to remain vertical along its longitudinal axis, thereby enabling the vehicle to always pass between obstacles spaced a given distance from each other regardless of the nature of the terrain between such obstacles. For example, if it is assumed that two trees are located on a sloping terrain and spaced from each other by a distance only slightly greater than the transverse distance between a pair of wheels of the vehicle, any transverse tipping of the vehicle due to the sloping terrain would make it impossible for the vehicle to pass between the trees. Due to the action of the hydraulic system of this invention, the vehicle will be maintained in a vertical position in spite of the sloping terrain and may therefore pass between the trees. In addition, the frame 10 of a vehicle equipped with the hydraulic system of this invention may be raised with respect to its wheels in order to clear obstructions such as stumps or large rocks lying in its path without upsetting the level orientation of the frame 10.

Although the particular vehicle shown in the drawing and described herein will have particular advantages, it is believed that those skilled in the art will make appropriate and obvious changes in the embodiment described hereinabove a order to suit a vehicle according to this invention for other particular applications. The compact and unitary configuration of the hydraulic control means disclosed herein will enable it to be easily incorporated into hydraulic systems of existing vehicles with little difficulty and the variety of automatic and manual controls that may be used in conjunction with the hydraulic control system described herein will readily suit it for use in vehicles designed for many applications.

What is claimed is:

1. A wheeled vehicle comprising an elongated frame, a first pair of wheels each journaled in one end of a different one of a first pair of rocker arms, said first pair of rocker arms being mounted on opposite sides of said frame at one end of said frame for rotation about their other ends, a second pair of wheels each journaled in one end of a different one of a second pair of rocker arms, said second pair of rocker arms being mounted on opposite sides of said frame at the other end of said frame for rotation about their other ends, a first pair of double acting hydraulic rams each mounted between said frame and a different one of said first pair of rocker arms and a second pair of double acting rams each mounted between said frame and a different one of said second pair of rocker arms, first hydraulic means interconnecting said first pair of rams to enable either of said first pair of rams to drive the other in the opposite sense, second hydraulic means interconnecting said second pair of rams to enable either of said second pair of rams to drive the other in the opposite sense, first control means controlling said first hydraulic means interconnecting said first pair of rams, second control means controlling said second hydraulic means interconnecting said second pair of rams, a source of pressurized fluid and fluid reservoir connected to said first control means and a source of fluid pressure and fluid reservoir connected to said second control means.

2. A wheeled vehicle as claimed in claim 1 wherein said first and second control means each comprise a four-way hydraulic valve actuated by a pendulum mounted on said elongated frame for rotation about an axis parallel to the longitudinal axis of said frame.

3. In a vehicle including a frame, a plurality of wheels mounted on said frame and a hydraulic system for varying the orientation of said wheels with respect to said frame, means for automatically actuating said hydraulic system to maintain a selected dimension of said frame in a selected position with respect to horizontal, said means including a pendulum comprising a massive member mounted on one of the major surfaces of a flat pendulum plate for rotation about an axis parallel to said major surface, said pendulum plate being mounted on a surface of a base plate parallel to said major surface for rotation about a second axis perpendicular to said major surface and intersecting said axis of rotation of said massive member at one end of said massive member, said base plate being mounted on said frame for rotation about said second axis and for rotation about a third axis intersecting said point of intersection of said axis of rotation of said massive member and said second axis transversely thereto, and a pair of contact sensing elements rigidly mounted on said surface of said base plate on opposite sides of said pendulum plate at the other end of said massive member, said contact sensing elements being spaced from said pendulum plate and adapted to be alternatively contacted thereby upon pivoting of said third axis about said second axis and upon rotation of said base plate about said second axis.

4. A wheeled vehicle comprising:
a. a frame and a pair of wheels;
b. means mounting each of said wheels on a different side of said frame for rotation about a common axis, said mounting means being adapted to provide relative movement of said frame and said axis toward and away from each other and including a pair of double acting hydraulic rams each associated with a different one of said wheels;
c. hydraulic means interconnecting said pair of double acting hydraulic rams to enable either of said rams to drive the other hydraulically in the opposite sense;
d. hydraulic control means controlling said hydraulic means interconnecting said rams; and
e. a source of pressurized fluid and a fluid reservoir connected to said control means whereby said rams may be selectively operated simultaneously either in tandem or each in opposite sense to the other.

5. A wheeled vehicle as claimed in claim 4 wherein said frame comprises two sections articulated with respect to each other with said pair of wheels mounted on one of said two frame sections and a further pair of wheels mounted on the other of said two frame sections.

* * * * *